United States Patent [19]

Wirth

[11] Patent Number: 4,480,722
[45] Date of Patent: Nov. 6, 1984

[54] SUSPENSION ARRANGEMENT OF MOVABLE PARTS, ESPECIALLY OF DISK BRAKES OF RAIL VEHICLES

[75] Inventor: Xaver Wirth, Ismaning, Fed. Rep. of Germany

[73] Assignee: Knorr-Bremse GmbH, Munich, Fed. Rep. of Germany

[21] Appl. No.: 388,317

[22] Filed: Jun. 14, 1982

[30] Foreign Application Priority Data

Jun. 15, 1981 [DE] Fed. Rep. of Germany ....... 3123640

[51] Int. Cl.$^3$ .............................................. F16D 65/06
[52] U.S. Cl. .................................. 188/59; 188/196 P; 188/206 R
[58] Field of Search ...................... 188/59, 71.8, 73.31, 188/196 P, 206 R, 214, 215, 220.6, 221.1, 199

[56] References Cited

U.S. PATENT DOCUMENTS

| | | | |
|---|---|---|---|
| 2,051,905 | 8/1936 | Sanford | 188/196 P X |
| 2,481,127 | 9/1949 | Ledwinka | 188/59 |
| 3,743,062 | 7/1973 | McIlroy | 188/221.1 X |
| 4,301,895 | 11/1981 | Harrison et al. | 188/59 |

*Primary Examiner*—Duane A. Reger
*Attorney, Agent, or Firm*—Pollock, Vande Sande & Priddy

[57] ABSTRACT

Suspension arrangement for actuation and abrasion dependent movable parts, especially brake pad holders (1) and non-rigid brake saddles, particularly of rail vehicle disk brakes having an abrasion compensation device, comprises a suspension bracket (7) which, on the one hand, is rigidly connected to the movable part (brake pad holder 1) or a fixed holding part, and which, on the other hand, is held at the respective other part by means of a sliding guide mechanism (8) extending parallel to the direction of motion and being self-locking under stress by a tilting moment of the suspension bracket (7) which is resiliently deformable in the direction of motion. The sliding guide mechanism (8) may be a bushing (9) displaceably held on a bolt (10), the length of the bushing (9) approximately corresponding to the diameter of the bolt (10). The suspension bracket (7) may be a leaf spring. Between a brake jaw lever (12) and the brake pad holder (1) a double ball and socket joint (11) may be provided, having two single ball and socket joints (14) arranged in the longitudinal direction of the suspension bracket (7) and in staggered relation to each other. The suspension arrangement assures efficient guidance of the moveable part, preventing oblique abrasion and providing automatic adjustment relative to the brake disk (2). It has an economical and space-saving design.

9 Claims, 5 Drawing Figures

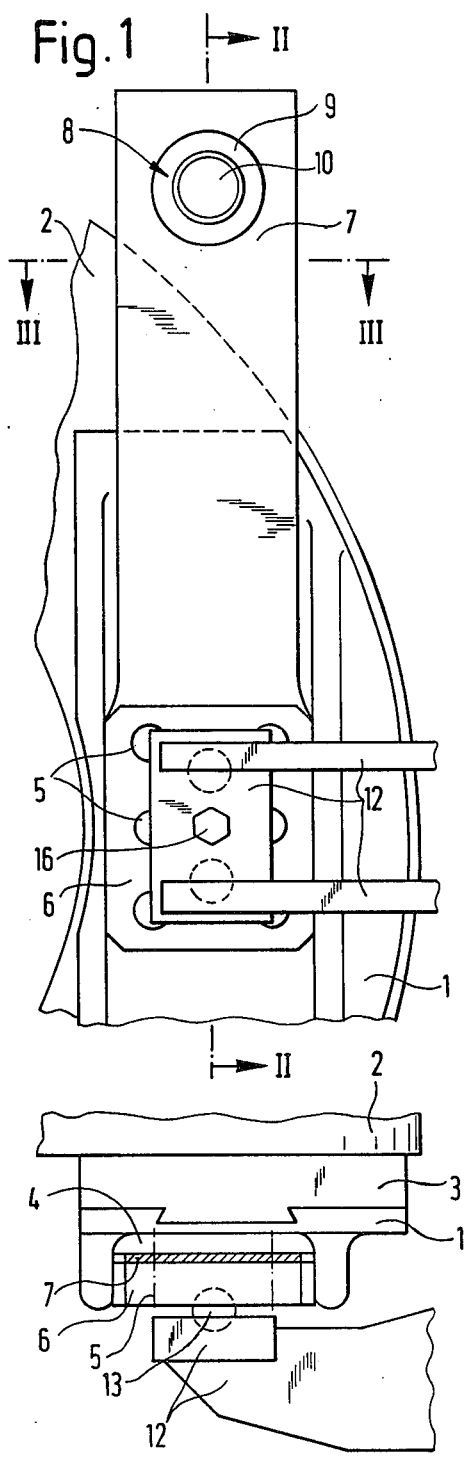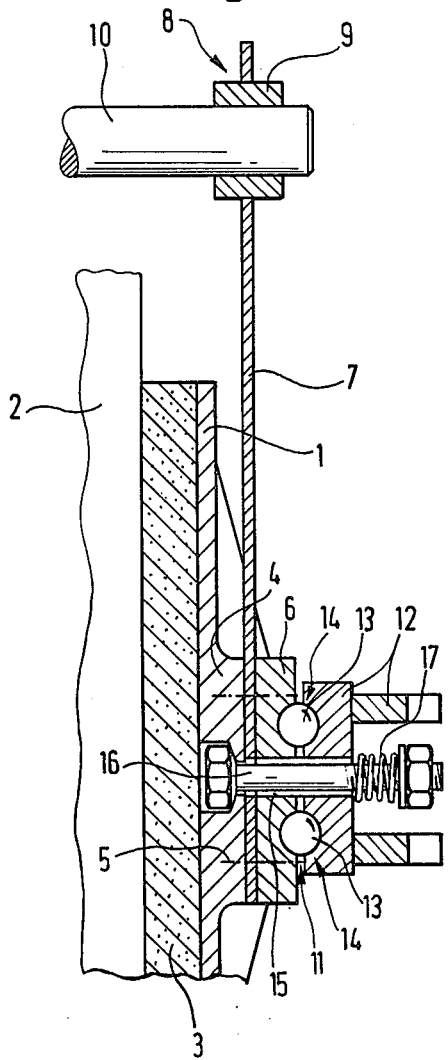

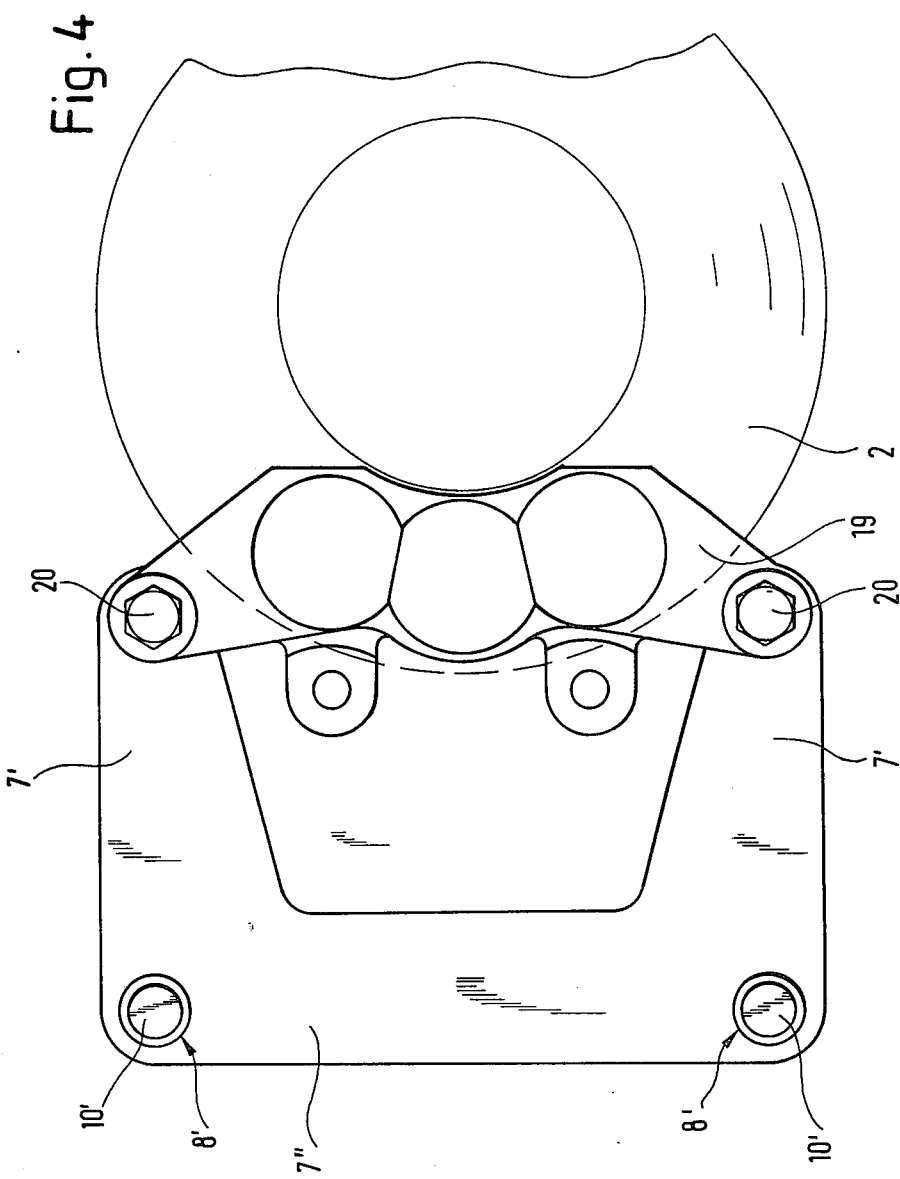

SUSPENSION ARRANGEMENT OF MOVABLE PARTS, ESPECIALLY OF DISK BRAKES OF RAIL VEHICLES

The invention relates to a suspension arrangement for actuation and abrasion-dependent parts, especially brake pad holders and non-rigid brake saddles of disk brakes, of rail vehicles in particular, having an abrasion-compensating device with at least one resilient suspension bracket extending from the movable part to a rigid holding device.

In disk brakes for rail vehicles, it is customary to transfer the braking forces caused by the braking moment from the brake pad holders onto the frame of the vehicle by means of suspension brackets extending essentially tangentially to the brake disk. In order to counteract oblique wear of the brake pads, it is known from German Published Application No. 1 780 451 to guide the brake pad holder parallel to the plane of the brake disk by means of the suspension bracket which is non-rotational about its longitudinal axis. In contrast thereto, and for the purpose of achieving uniform surface pressure of the brake lining, it is also known (from German Published Application No. 2 213 321) to link the suspension bracket by means of a ball and socket joint or a rubber-metal bearing, respectively, moveably into all directions, to the brake pad holder; in this case, the brake lever of a brake jaw coacts with the brake pad holder by way of a cylinder joint in a direction which is essentially parallel to the axial longitudinal direction of the suspension bracket, with a spring tensioning the brake jaw lever and the brake pad holder against each other.

In prior art suspension arrangements comprising suspension brackets, the suspension points of the brake pad holders in case of brake pad abrasion move in circular arcs. The height displacement caused thereby has an adverse effect on the carrying diagram of the pad holder joints; it leads to edge wear. In addition, in case of inclination or displacement of the brake disk axis between the left and right hand brake shoes, the result is a difference in height displacement, requiring costly linking of the tensioning mechanism and possibly causing bending moments in the brake disk. For purposes of reducing the complications arising from deviations of the brake disk from its normal rated position, it is also known to link the suspension brackets to the frame of the vehicle by means of a balance-beam type equalizing lever; this design, however, is expensive and often infeasible for lack of space.

French Pat. No. 1,388,392 closes a combined abrasion-compensation and centering arrangement in which the ends of the brake jaw levers linked to the brake pad holders are interconnected by means of a spring in the shape of essentially a wide U, with a considerably osfter spring leaf of the said spring extending from the center section of the spring to the rigid fastening points.

For disk brakes with a non-rigid brake saddle, it is known that the brake saddle can be displaceably connected on bolts extending parallel to the axis of the brake disk. The brake saddle in this case is displaced with each tensile stress applied to the disk brake, and the sliding connection is correspondingly subject to wear and tear.

The object of the invention is a suspension arrangement of the initially described type which assures satisfactory parallel guidance of the movable parts while requiring little space and low construction costs; which prevents, in case of an abrasion of the brake pads, or respectively, a displacement of the brake disk, a height displacement of the brake linings on both sides, being pressed against a brake disk; and, at the same time, assures equal lift clearance of the brake pads on both sides when the disk brake is in its released position. Because of its guiding characteristics, the suspension arrangement is also intended to counteract oblique abrasion of the brake pads.

The invention achieves this object in that the suspension bracket, resiliently deformable in the direction of movement of the movable part, is rigidly fastened to the said movable part or to the holding part, while, on the other hand, it is attached to the other of these parts by means of a sliding guide mechanism extending parallel to the direction of movement and being self-locking when subjected to tilting loads.

This particular design of the suspension arrangement makes it possible, during braking operations, for the movable part to perform the braking and, possibly, the wearing lift with resilient deformation of the suspension bracket, while the sliding guide mechanism locks because of the tilting moment caused by the deformation of the suspension bracket, and does not follow the lift. Simultaneously, the suspension bracket effects parallel guidance of the movable part, counteracting the oblique wear of the brake pads. Upon release of the brake, the suspension bracket springs back, returning the movable part to its release position, and lifting the brake pads at both sides of the brake disk from the latter in a uniform manner. Any abrasion of the brake pads which may have occurred during the braking operation is compensated for by the abrasion-compensating device, thereby limiting the total release lift of the disk brake. During subsequent operation with released brakes, jolts caused, for instance, by the motions of travel, result in such displacement of the sliding guide mechanism that the suspension bracket loses all of its resilient deformation and returns to its tension-free condition.

It may be practical to provide the suspension bracket with a leaf spring extending from the rigid connection to the sliding guide mechanism, and especially to design it entirely as the said leaf spring. Preferably the sliding guide mechanism is arranged between the suspension bracket and the holding part. A simple and prefered embodiment of the sliding guide mechanism is as a bushing displaceably held on a cylindrical bolt extending parallel to the direction of the movement of the movable part, the length of the said bushing preferably corresponding approximately to the diameter of the said bolt.

In the case of the suspension arrangements intended for brake pad holders of disk brakes tensioned by means of brake jaws, in which one brake jaw lever is connected with the brake pad holder by means of a joint, it is practical that the joint have degrees of rotational freedom at least about a rotational axis extending parallel to the suspension bracket and to the brake jaw lever, with the joint preferably being a double ball and socket joint with two single ball and socket joints in staggered arrangement in the longitudinal direction of the suspension bracket. This particular arrangement will have the effect that the tensioning motions of the brake jaw lever can be transmitted to the brake pad holder by way of the joint without causing rotational moments, so that these tensioning motions cannot cause oblique abrasions. At the same time, the double ball and socket joint counteracts, in addition to the resilience of the suspension bracket, any oblique abrasion caused by the intake-servo-effect, since in an oblique abrasion of this type and the consequent inclination of the brake pad holder, a tilting moment counteracting the inclination is effected by the corresponding eccentric load effect of the brake jaw lever. With this particular design of the suspension bracket, it is practical to tension the brake pad holder and the brake jaw lever against each other by means of a resilient tensioning device arranged between the single ball and socket joints.

The drawings show preferred embodiments of the suspension arrangement according to the invention, as follows:

FIG. 1 is a first embodiment in plan view;

FIG. 2 is a section view along line II/II in FIG. 1;

FIG. 3 is a section view along line III/III in FIG. 1; and

FIG. 4 is a second embodiment.

Figure 5:
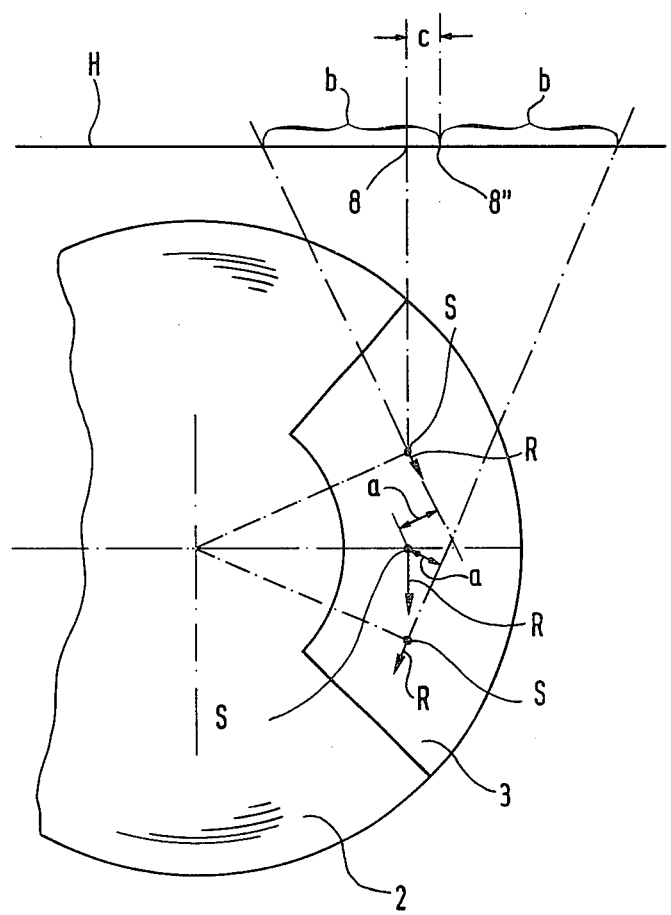
FIG. 5 is an example giving dimensions.

FIG. 1 to FIG. 3 show a brake pad holder 1, bearing on one side a brake pad 3 to be pressed against a brake disk 2. Between a centrally arranged support projection 4 of the brake pad holder 1 and a bearing section 6 connected thereto by means of screws 5, one end of a suspension bracket 7, in the form of a leaf spring, is rigidly connected. Suspension bracket 7 extends upwardly more or less tangentially to brake disk 2 and is held adjacent its upper end by means of a sliding guide mechanism 8. Sliding guide mechanism 8 comprises a bushing 9, connected to suspension bracket 7 and arranged for sliding movement along a bolt 10, said bolt extending parallel to the axis of brake disk 2. The length of bushing 9 corresponds at least approximately to the diameter of bolt 10 which is rigidly held, e.g., at the vehicle frame, in a manner not shown.

Bearing section 6 is held by way of a double ball and socket joint 11 on brake jaw lever 12, extending substantially radially to brake disk 2. The brake jaws of which brake jaw lever 12 is a part are not shown in detail. The double ball and socket joint 11 comprises two spheres 13 offset with respect to one another along the longitudinal direction of suspension bracket 7, each of them being journaled in step bearings of bearing section 6 and brake jaw lever 12, thus forming a single ball and socket joint 14. A bolt 16, serving as tension rod, passes through flush bores 15 of bearing section 6 and brake jaw lever 12, said bolt being anchored to supporting projection 4 on the one hand, a spring 17 being tensioned between its other end and brake jaw lever 12.

On the other side of brake disk 2 there is a suspension arrangement (not shown) designed identically to that of FIGS. 1 to FIG. 3, for an additional brake pad holder with a brake pad which is to be pressed against the brake disk 2 and is located opposite to brake pad 3.

Upon brake release, brake pad 3 is located at a small distance in front of brake disk 2, said distance corresponding to the release lift. The leaf spring of suspension bracket 7 is relaxed, i.e., it is not resiliently deformed.

For the braking operation, the illustrated end of brake jaw lever 12 is moved in the direction of brake disk 2, carrying along double ball and socket joint 11 operating by means of the two balls 13, bearing section 6 and supporting projection 4 and brake pad holder 1, and pressing brake pad 3 against brake disk 2. The leaf spring of suspension bracket 7 is thereby resiliently deformed in the direction of brake disk 2, while asserting a tilting moment on bushing 9 about an axis which is perpendicular to bolt 10. As a result of this tilting moment, bushing 9 jams on bolt 10 and thereby retains its momentary position. If, during the braking operation, there should be an abrasion of brake pad 3, brake pad holder 1 will approach brake disk 2 correspondingly, with suspension bracket 7 being further deformed to a degree corresponding to the abrasion.

During release of the brake (without previous abrasion of the brake pad) brake jaw lever 12 returns to its starting position, carrying along brake pad holder 1 while lifting brake pad 3 from brake disk 2, operating by way of spring 17 and tension rod 16, and supported by the proper tension of suspension bracket 7. Suspension bracket 7 thereby returns to its undeformed initial position. If, during the preceeding braking operation, an abrasion of brake pad 3 has occurred, triggering the abrasion-adjusting device, brake jaw lever 12 does not return completely to its initial position during the release operation, but remains stationary at a distance from its initial position, said distance corresponding to the abrasion adjustment. Brake pad holder 1 lifts brake pad 3 from the brake disk 2 by a distance corresponding to the normal rated lift clearance, but does not return completely to its initial position. Initially, suspension bracket 7 remains slightly resiliently deformed even in the released position. During the ensuing tremors which can, for instance, be caused by jolts during travel, the clamping of bushing 9 on bolt 10 is released for brief intervals, so that, affected by the resilient deformation tension of the suspension bracket 7, bushing 9 moves leftward on bolt 10, as shown in FIG. 2, until the suspension bracket 7 is entirely relaxed and free of deformation. Sliding guide mechanism 8 therefore provides an automatic adjustment of the linkage of suspension bracket 7 on bolt 10, which represents a fixed retaining member, so that, during braking operations, suspension bracket 7 need be deformed only minimally from its relaxed position, so that brake pad holder 1 is not subjected to changes in height. Even in case of a lateral displacement of brake disk 2 from its normal position, the linkage of suspension bracket 7 on bolt 10 is subjected to a corresponding adjustment by way of sliding guide mechanism 8, so that brake pad 3, with suspension bracket 7 relaxed, will be at a distance from brake disk 2 which corresponds to the nominal rated release lift, whenever the brakes are in their released position. Brake pad holders 1 arranged at both sides of brake disk 2 therefore are at all times kept at their same height, the brake jaws associated with brake lever 12 remain free of torsional stress, and brake disk 2 remains free of bending stresses. At the same time, suspension bracket 7, designed as a leaf spring, assures guidance of brake pad holder 1 parallel to the plane of brake disk 2, thereby counteracting oblique abrasion of brake pad 2 in the circumferential as well as in the radial direction of brake disk 2.

The double ball and socket joint 11 guides brake jaw lever 12 for free rotation about a rotation axis parallel to the longitudinal direction of suspension bracket 7 to brake pad holder 1, so that the pinching motion of the brake jaw lever 12 does not transmit a rotation moment to brake pad holder 1 about a rotation axis parallel to the longitudinal direction of suspension bracket 7. If, however, the servo-effect should cause an increased abrasion effect on brake pad 3 at the inlet side, brake pad holder 1 begins to rotate about a rotation axis extending essentially parallel to the longitudinal direction of brake jaw lever 12, whereby the single ball and socket joint 14 located opposite to the direction of the rotation is changed with a correspondingly greater load, and the other single ball and socket joint with a correspondingly weaker load from the braking power to be transmitted from brake jaw lever 12 to brake pad holder 1. The result is a displacement of the point of application of brake jaw lever 12 on brake pad holder 1, counteracting the oblique position of brake pad holder 1, relieving that end of brake pad 3 which shows the greater abrasion and correspondingly adding additional load to the opposite end of the brake pad. In this manner, the oblique abrasion of brake pad 3 in the circumferential direction is counteracted by the inherent tension of suspension bracket 7 as well as by the displacement of the point of introduction of braking power.

In case of an inclined position of brake disk 2, brake pad holder 1 can adapt without crowding to the respective disk position, making use of the resilience of the leaf spring of suspension bracket 7 and the corresponding excursion of double ball and socket joint 11.

The suspension arrangement described above therefore provides the advantages that (a) practically no constraining forces occur in the brake jaw which is part of brake jaw lever 12 when brake disk 2 is in an inclined position or when there is a lateral displacement; (b) only few joints are required, keeping the manufacturing costs low; (c) because of the few joints and with regard to the mutual tensioning of brake jaw lever 12 and brake pad holder 1 by means of spring 17 there is no rattling and only minimal abrasion; (d) the extensive separation of brake jaw—and brake shoe kinematics facilitates a simple construction of the brake jaw; (e) oblique abrasion of the brake pad is prevented or effectively reduced both directions; (f) a very flat and thus space-saving design of the brake pad holder is possible; and (g) the brake pad holder requires only very simple machining, making its manufacture cheap.

The suspension arrangement is usable not only for jaw brakes as described in connection with the above embodiment, but also for disk brakes with non-rigid brake saddles. FIG. 4 shows a displaceable brake saddle 19 which straddles brake disk 2. For the attachment of brake saddle 19, both its ends have suspension brackets 7' formed from leaf springs attached by means of screws 20, extending more or less radially to brake disk 2 and connectable to each other by means of a tongue 7''. Suspension brackets 7' are, on the other hand, held by bolts 10', representing fixed retaining members, by way of a sliding guide mechanism 8', which in design corresponds to sliding guide mechanism 8 of FIGS. 1 and 2. Bolts 10' extend parallel to the axis of brake disk 2. Sliding guide mechanism 8', like sliding guide mechanism 8 according to FIGS. 1 to 3, permit, with brakes released and in the presence of dynamic power effects, an adjustment of brake saddle 19 into a central relaxed position with regard to brake disk 2. During braking, the brake saddle 19, for purposes of pressing the brake pad which is connected thereto (but not shown), against brake disk 2, is laterally displaced simultaneously with a resilient deformation of suspension brackets 7'; the function of suspension brackets 7' is identical to that of suspension brackets 7, and thus need not be further described.

In modification of the above described embodiments, it is possible to interchange the arrangement of the rigid tensioning and sliding guide on suspension brackets 7 and 7', in such a manner that the sliding guide mechanisms 8 and 8', respectively, are located at the connecting point of suspension bracket 7 with the brake pad holder 1, or, respectively, suspension bracket 7' with brake saddle 19, and the rigid tensioning of suspension bracket 7 and 7', respectively, being located at their connecting points on the rigid retaining member. In all of the preferred embodiments, the brake moment is transmitted from brake pad holder 1, or from brake saddle 19, respectively, to the rigid retaining member, i.e., bolts 10 and 10', respectively, by way of suspension brackets 7 and 7', respectively.

In an additional modification of the foregoing preferred embodiments, and assuming efficient guidance of brake jaw lever 12, it is also possible to replace double ball joint 11 by a simple joint which is movable in all directions, especially a ball joint. The ball within such a joint would have to be centrally arranged so that its center would come to rest on the axis of the bolt 16 which would then be superfluous or which would then have to be laterally displaced.

If the brake pad holder 1 is suspended, according to FIG. 1 by means of the suspension bracket 7, in the tangential direction of the theoretical friction radius of brake disk 2, the brake pad holder, because of the finite expansion of brake pad 3, is given a rotational moment about an axis which extends parallel to the axis of the brake disk. Given a pendulous suspension of the brake pad holder, this rotational moment must be compensated by an additional force which places stress particularly on brake jaw lever 12. In order to keep the brake jaw lever 12 as well as the joint between the latter and brake pad holder 1 free of this additional stress, in a modification of the arrangement of FIG. 1, suspension bracket 7 is arranged so as not to be tangential to brake disk 2, but in alongitudinal direction inclined thereto, in such a manner that sliding guide mechanism 8 with bushing 9 and bolt 10 is horizontally displaced to the right when compared with FIG. 1, and will consequently be located at a greater distance from brake disk 2. The measurement of this displacement can be determined as follows:

It is to be imagined that brake pad 3 according to FIG. 5 is divided into two symmetrical halves along the horizontal line of the radius of brake disk 2. The contact pressure force no longer affects the total center of gravity $S_{ges}$ but in equal parts the centers of gravity $S_{teil}$ (partial) of the halves of the pad and, correspondingly, instead of the total friction force $R_{ges}$ of the entire brake pad 3 only results in partial friction forces R, with the friction forces $R_{ges}$ or R, respectively, running each vertically to the brake disk radius passing through the respective center of gravity $S_{ges}$ or $S_{teil}$. FIG. 5 shows that the partial friction forces R each extend at a distance a from the total center of gravity $S_{ges}$, thus asserting a rotation moment on brake pad 3. Given a suspension of brake pad holder 1 by means of suspension bracket 7 vertically above the total center of gravity $S_{ges}$, as shown in FIG. 1 with sliding guide mechanism 8, in which suspension braket 7 runs vertically to the brake disk radius intersecting the point of gravity $S_{ges}$, the rotation moment must be absorbed in a separate manner. If, however, according to FIG. 5, the upper bearing of suspension bracket 7 is displaced by the distance c towards the right, in such a manner that the new point of bearing sliding guide meachnism 8'' comes to be located centrally between the point of intersection of the extensions of the partial friction forces R with a horizontal H through the upper bearing point, i.e., at a distance b from these points of intersection, the total friction force $R_{ges}$ at the lever arm c provides a counter-rotation moment compensating the rotation moment. In this instance, rotation moment M equals the double product of the partial friction force R by the distance a, and corresponds to the product of the total friction force $R_{ges}$ by the distance c, viz.:

$$M = R \times a + R \times a = R_{ges} \times c$$

This compensation of the rotation moment relieves specially brake jaw lever 12 and its bearings of an otherwise common additional stress.

1. Suspension arrangement for actuation and abrasion dependent movable means, especially for a brake pad holder and non-rigid brake saddle of a rail vehicle disk brake having abrasion compensation means, said arrangement comprising at least one resilient suspension bracket (7, 7') extending from a said movable means (1; 19) to a rigid retaining means (10; 10'), said suspension bracket being resiliently deformable in the direction of movement of said movable means being rigidly connected to one of said movable means and said retaining means and being retained on the other of said movable means and retaining means by means of a sliding guide meachnism (8, 8') extending parallel to the direction of movement and being self-locking under stress load of a tilting moment.

2. Suspension arrangement as claimed in claim 1, wherein said suspension bracket (7, 7') comprises a leaf spring extending from the rigid connection to said sliding guide mechanism (8, 8').

3. Suspension arrangement as claimed in claim 1 or 2, wherein said sliding guide mechanism (8, 8') is arranged between said suspension bracket (7, 7') and said retaining means.

4. Suspension arrangement as claimed in claim 1 or 2, wherein said sliding guide mechanism (8) comprises a bushing (9) movably held on a cylindrical bolt (10) extending parallel to the direction of movement of said movable means.

5. Suspension arrangement as claimed in claim 4, wherein the length of said bushing (9) approximately corresponds to the diameter of said bolt (10).

6. Suspension arrangement for a brake pad holder of disk brakes tensionable by means of a brake jaw, a brake jaw lever being connected with a said brake pad holder by means of a joint, according to claim 3, said joint having degrees of rotational freedom about at least one rotational axis extending parallel to said suspension bracket (7) and one rotational axis extending parallel to said brake jaw lever (12).

7. Suspension arrangement as claimed in claim 6, wherein said joint comprises a double ball and socket joint (11) with two single ball and socket joints (14) arranged in staggered positions with respect to each other in the longitudinal direction of said suspension bracket (7).

8. Suspension arrangement as claimed in claim 7, wherein said brake pad holder (1) and brake jaw lever (12) are tensioned against each other by means of a resilient tensioning mechanism (16, 17) acting between said single ball and socket joints (14).

9. Suspension arrangement as claimed in claim 1, wherein said suspension bracket (7) extends longitudinally outward from the tangential direction of said brake disk (2) and away from the latter.

* * * * *